(12) United States Patent
Cormier et al.

(10) Patent No.: US 9,347,231 B2
(45) Date of Patent: May 24, 2016

(54) CONSTRUCTION HANGER BRACE

(75) Inventors: Timothy J. Cormier, Springboro, OH (US); Andrew P. Magee, Centerville, OH (US); Richard G. Lindstrom, Lake Forest, IL (US)

(73) Assignee: DAYTON SUPERIOR CORPORATION, Miamisburg, OH (US)

( * ) Notice: Subject to any disclaimer, the term of this patent is extended or adjusted under 35 U.S.C. 154(b) by 413 days.

(21) Appl. No.: 13/613,444

(22) Filed: Sep. 13, 2012

(65) Prior Publication Data

US 2013/0062491 A1    Mar. 14, 2013

Related U.S. Application Data

(60) Provisional application No. 61/534,630, filed on Sep. 14, 2011.

(51) Int. Cl.
| | |
|---|---|
| *F16B 45/00* | (2006.01) |
| *E04G 17/18* | (2006.01) |
| *F16B 9/00* | (2006.01) |
| *E04B 1/41* | (2006.01) |

(52) U.S. Cl.
CPC . *E04G 17/18* (2013.01); *E04B 1/40* (2013.01); *F16B 9/00* (2013.01); *F16B 45/00* (2013.01)

(58) Field of Classification Search
CPC ........ A01K 97/00; F16M 13/02; F16B 37/00; F16B 43/00; F16B 9/00; F16B 45/00; E04B 1/40; E04B 1/41; E04G 21/25
USPC ............ 248/214, 216.1, 217.3, 217.4, 218.2, 248/267, 304, 230.9, 227.2, 228.1, 534, 248/535, 538; 52/705
See application file for complete search history.

(56) References Cited

U.S. PATENT DOCUMENTS

| | | | | |
|---|---|---|---|---|
| 294,385 | A | * | 3/1884 | Hemmenway ................. 248/267 |
| 977,835 | A | * | 12/1910 | Piscator ......................... 248/514 |
| 1,067,748 | A | * | 7/1913 | Mitchell .................... 248/227.2 |
| 1,511,217 | A | * | 10/1924 | Floercky ....................... 131/239 |
| 2,318,282 | A | * | 5/1943 | Bjorkman ................ 102/275.12 |
| 2,491,008 | A | * | 12/1949 | Lake ............................. 224/103 |
| 2,925,916 | A | * | 2/1960 | Pollock .................. 211/119.004 |
| 2,931,603 | A | * | 4/1960 | Johnston et al. .............. 248/538 |
| 2,979,302 | A | * | 4/1961 | Archbold ...................... 248/247 |
| 3,312,442 | A | * | 4/1967 | Moeller .................... 248/216.1 |
| 3,993,279 | A | | 11/1976 | Holt |
| 4,417,712 | A | * | 11/1983 | DeHart .................... 248/220.22 |
| 5,483,772 | A | * | 1/1996 | Haddock ........................... 52/25 |
| 5,876,009 | A | * | 3/1999 | Simoncioni, Jr. ............. 248/339 |

(Continued)

OTHER PUBLICATIONS

CA, Office Action, Canadian Application No. 2,896,232, dated Dec. 14, 2015.

*Primary Examiner* — Nkeisha Smith
(74) *Attorney, Agent, or Firm* — Thompson Hine LLP

(57) ABSTRACT

A construction hanger comprising a brace including a first elongated member; an arm extending from one end of the first elongated member at an angle thereto, the arm and the elongated member cooperating to engage the surface of a construction support member; a guide at the end of the elongated member opposite the one end, the guide being capable of receiving a hanger member, the guide being positioned on or formed within the brace and at an angle thereto; the guide tying the hanging member to the construction support member by means of the brace.

16 Claims, 5 Drawing Sheets

(56) References Cited

U.S. PATENT DOCUMENTS

| | | | |
|---|---|---|---|
| 6,254,039 B1* | 7/2001 | Zimmerman | 248/48.2 |
| 6,378,819 B1* | 4/2002 | Johnson | 248/214 |
| 6,543,729 B1* | 4/2003 | Ylonen | 248/48.1 |
| 6,672,559 B1* | 1/2004 | Boldia | 248/538 |
| 6,742,757 B2* | 6/2004 | Fox | 248/538 |
| 6,820,868 B1* | 11/2004 | Reymus | 269/41 |
| 7,287,734 B2* | 10/2007 | Bell | 248/262 |
| 7,494,095 B2* | 2/2009 | Walker et al. | 248/48.2 |
| 2003/0098403 A1* | 5/2003 | Fox | 248/538 |
| 2003/0183739 A1* | 10/2003 | Fox | 248/537 |
| 2012/0305723 A1* | 12/2012 | Heath et al. | 248/228.1 |
| 2013/0048825 A1* | 2/2013 | Stalemark | 248/534 |
| 2014/0196400 A1* | 7/2014 | Bell | 52/705 |
| 2014/0326848 A1* | 11/2014 | Popkin | 248/475.1 |

* cited by examiner

CONSTRUCTION HANGER BRACE

RELATED APPLICATION DATA

This application claims the benefit of U.S. Provisional Application No. 61/534,630, filed Sep. 14, 2011, which is incorporated herein by reference in its entirety.

FIELD

The invention relates to a construction hanger for use in assembling concrete forms and, more particularly, tying the form members to a construction support member such as an I-beam. This invention provides an attachment of overhanging brackets, scaffolding, or other accessories to steel, concrete, or other bridge beams or construction support members.

BACKGROUND

In order to construct concrete sections of roads, bridges, buildings, or other components, a form is provided into which the concrete is poured and allowed to harden. These forms may take on a variety of shapes and configurations according to the use that they're put.

In creating overpasses, standing walls, or other sections, a framework of steel girders, I-beams, or other supporting structure is assembled before pouring the concrete to provide a structure from which to assemble the form. The form is supported on the girders or I-beams by means of construction hangers that support the weight of the form and concrete by distributing the load into the girder. Because the hangers may support the forms from within the volume of the form, they are usually unrecoverable after the concrete has been poured and allowed to harden. Therefore, it is preferable to provide economical hangers that can be inexpensively replaced as hangers are consumed.

These hangers may also be used to support scaffolding or other accessories to support structure.

An example of one prior art hanger generally includes a brace and a guide welded together to form the hanger. The brace may be formed from a steel bar bent around a beam flange to form a hook while the guide, which may be formed from a piece of stamped and bent steel, is welded to the bar opposite the hook. A support rod may be inserted through the guide and a form is attached to the support rod. By way of example, the support rod may be a threaded rod held in place by a hex nut or the like.

SUMMARY OF THE INVENTION

According to a first aspect of the invention, a construction hanger comprises a brace or bracket formed or cut from a substantially flat metal plate and an arm extending from its distal end and a proximal end where a guide having a channel is positioned and bonded or formed onto the brace. The term "brace" as used herein refers to that portion of the hanger 10 that engages the construction support member such as an I-beam. The term "hanger" refers to the brace in combination with the guide member that receives the hanger rod that ties the form to the support member. The term "hanger" does not include the rod itself.

According to one variation of the first aspect of the invention, the brace includes an arm that is shaped to receive and/or engage a beam profile. The beam profile may be the profile of any of a variety of construction elements such as a square or tapered I-beam, a C-channel beam, a square beam, an angle-beam, or other type of beam that is well known to those having skill in the art.

According to another variation, the guide member is bonded to the brace by means of welding, one or more fasteners, an interference fit, or other technique known to those having skill in the art. The guide member may have a variety of constructions, including but not limited to a round tube, a square tube, and a U-channel. The function of the guide is to retain the hanger rod by which form members are tied to the construction supports.

According to yet another variation, the guide includes a major axis that is at an angle to the brace. For example, the angle between the major axis and the brace may be at or about 45°. Other arrangements and angles are also anticipated, for example the angle between the clip and the brace may be 90°, and the brace and the guide need not be in the same plane.

According to yet another variation, the brace may include a bearing surface or extension that is typically triangular in shape at the proximal end of the brace to which the guide member is bonded.

In a second aspect of the invention the hanger includes one or more bearing plates. These bearing plates are optionally positioned on an underside of the brace and may be positioned between the distal and proximal ends. The bearing plates are positioned between the retainer or flange and the beam to provide surface area for load distribution. Alternatively, the bearing plates may be positioned on the upper surface of the arm forming the brace.

Another aspect of the invention is a novel method for forming the hanger in accordance with the above-described aspects. A substantially flat sheet of material, for example plate steel, is provided. A brace is cut from the material, the retainer having a distal end with a flange having a profile approximately complementary to a beam profile so that when attached to the beam profile the retainer fits accurately and tightly to the beam profile. A guide is provided and may include a circular, square, or U-shaped cross section. The guide is bonded to the brace at a proximal end of the retainer. The angle between the guide and retainer may be approximately 45°.

According to another variation, one or more bearing plates may be provided. These bearing plates are bonded to the brace in a perpendicular arrangement so as to distribute the load between the retainer and a beam to which the hanger may be attached. The bearing plates may be attached to the flange or directly to the brace and may either protrude to form a bearing surface corresponding to the beam profile or may be flush with a bearing surface of the brace.

Another aspect of the invention is a novel method for using the hanger in accordance with the above-described aspects. According to this aspect, a hanger is provided comprising a brace cut from a sheet of material and having an arm having a profile corresponding to a beam profile and a proximal end having a guide member. The hanger is provided on a beam having the beam profile such that the flange engages the beam profile to prevent movement along the length of the retainer or about an axis parallel to the major length of the beam. A support rod is provided that engages the guide. A load may then be applied to the support rod so that the force is transmitted axially through the support rod to the guide and subsequently to the retainer and beam.

DETAILED DESCRIPTION

Figure 1A:
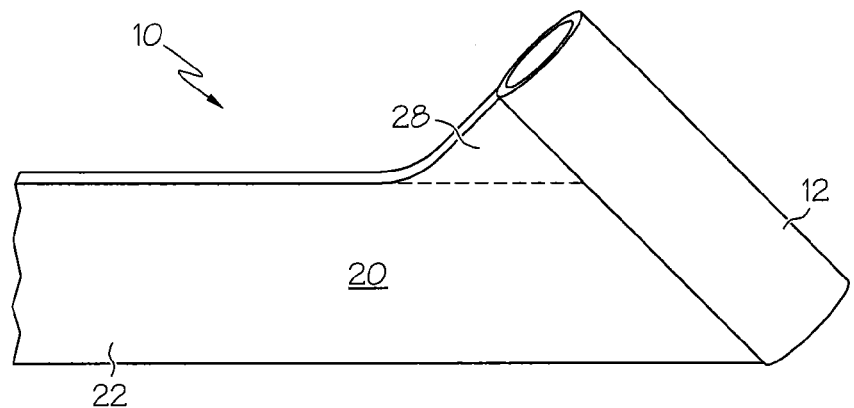
FIGS. 1A-1C respectively illustrate three embodiments of construction hanger braces in accordance with the invention.
Figure 1B:
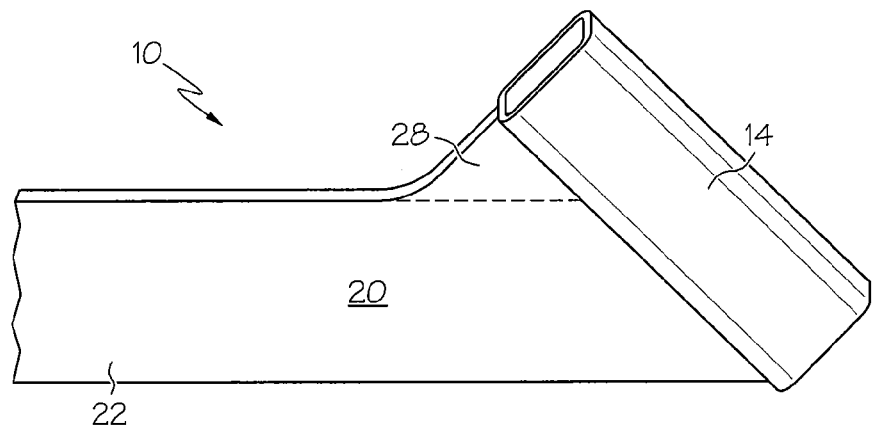
Figure 1C:
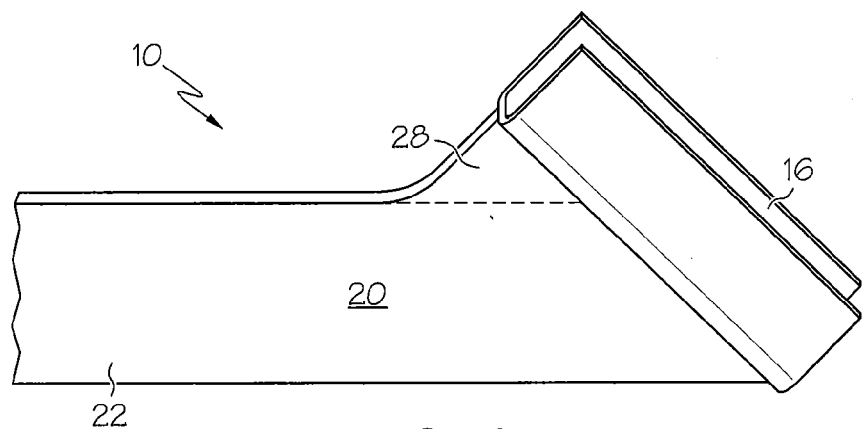
Figure 2A:
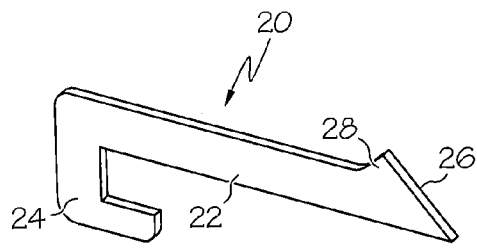
FIGS. 2A-2D respectively illustrate brace elements useful in providing hangers in accordance with different embodiments of the invention.
Figure 2B:
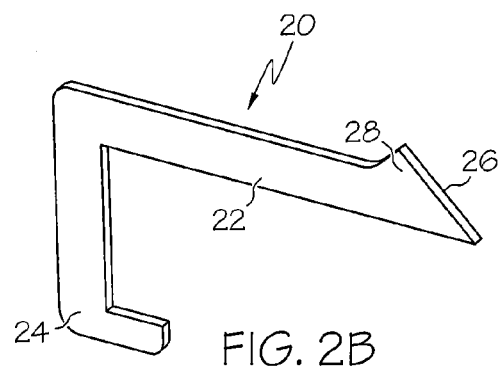
Figure 2C:
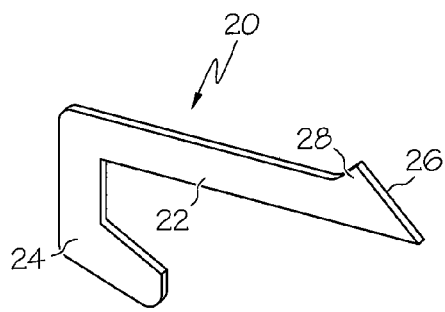
Figure 2D:
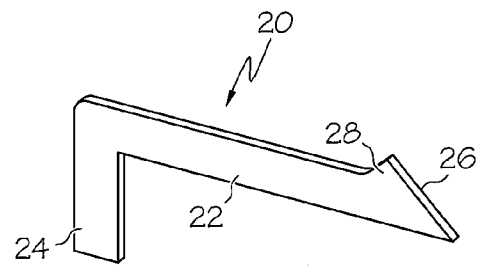

FIG. 1A illustrates a partial view of a hanger 10 in accordance with one embodiment of the invention wherein the hanger includes a circular tube 12 that functions as a guide member for the hanger rod that is assembled with the hanger to assemble a concrete form member with a construction support member such as an I-beam. FIG. 1B on the other hand illustrates an embodiment in which the guide member is a square tube 14 and FIG. 1C illustrates an embodiment in which the guide member is a U-shaped channel member 16. In each embodiment, the guide member 12, 14 or 16 is carried on a brace 20 including an elongated bar 22. The bar terminates in an end surface 26 (FIG. 2). In the illustrated embodiment, the bar 22 is formed with a triangular extension 28 which provides additional support for the guide member and distributes the forces acting on the guide member over a longer lineal surface.

FIG. 2 illustrates four embodiments (FIGS. 2A-2D respectively) for brace members 10 that can be used in constructing a hanger in accordance with various embodiments of the invention. The brace member 20 includes an elongated bar 22 from which an arm 24 extends. The arm 24 extending from the elongated bar 22 is shaped to engage a construction support member as discussed in more detail below. The brace 20 includes a sloped end surface 26 which can be bonded to or formed into a guide member such as members 12, 14 and 16 illustrated in FIG. 1. FIG. 2 illustrates an embodiment of the invention in which the guide member is carried on the sloped end surface 26 that is in the same plane as the brace member 20. It is not essential that the hanger be constructed in this fashion. The end surface could be formed such that the guide member is located in at any desired angle with respect to the brace member within or out of the plane of the plate forming the brace 20. In the embodiment shown in FIG. 2, the brace members 20 each include a bearing extension 28 which is generally triangular in shape (note the dotted lines) and which further extends or widens the surface 30 of the elongated bar 22 and the end surface 26. This facilitates bonding the guide member to the brace 20 and distributes forces over a larger surface area.

Figure 3:
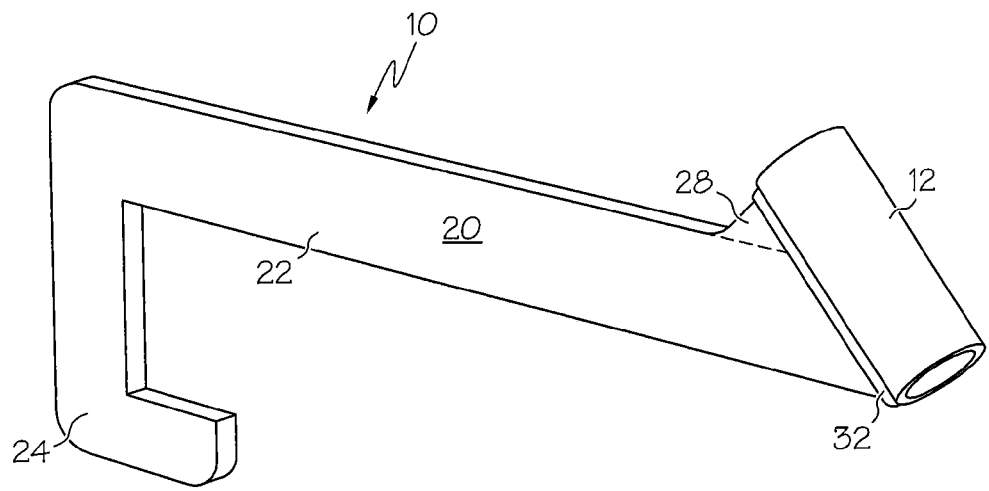
FIG. 3 is a perspective view of a hanger in accordance with one embodiment of the invention.

FIG. 3 illustrates an embodiment of the invention in which a tubular guide 12 is bonded to the brace 20 by a weld line 32. However, those skilled in the art will appreciate that other techniques than welding may be used to bond and/or form the guide member 12 on the end of the brace 10. The guide member can be formed separately and bonded to the brace 20 using an adhesive or weld, or the guide member can be a metal formed extension of the brace member 20 and the guide member is formed by bending the metal of the brace member. In this embodiment, there is no end surface 26 as shown in the embodiments of FIG. 2. Instead the metal plate forming the end of the brace 20 would be formed into a tube.

Figure 7:
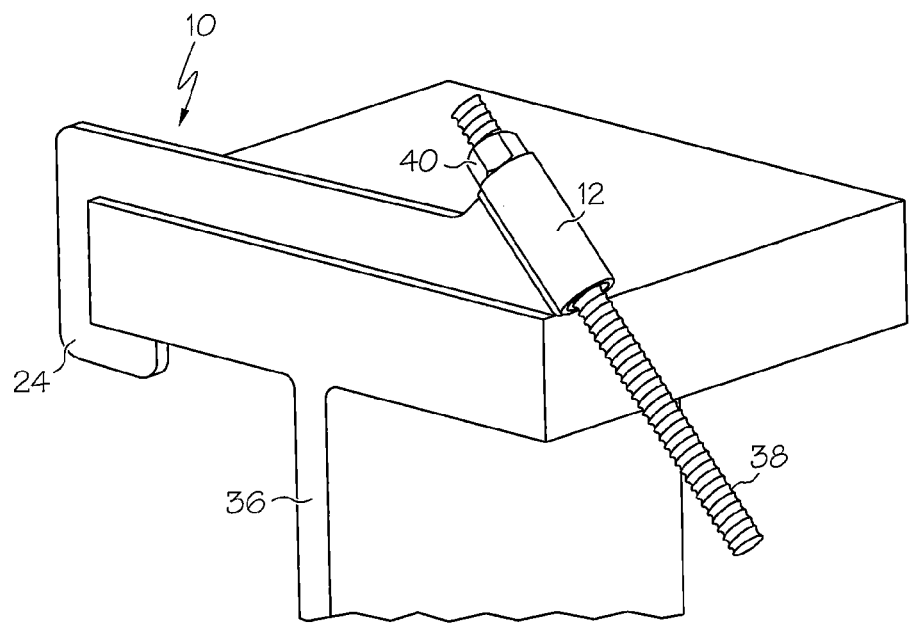
FIG. 7 illustrates a hanger in accordance with one embodiment of the invention in engagement with an I-beam.

FIG. 7 illustrates an example of the hanger 10 in position on an I-beam 36. The arm 25 includes a right angle extension which receives the rectangular shape or profile of the I-beam. A threaded hanger rod 38 is inserted in and through the guide member 12 and retained by a threaded nut 40. The rod member engages the construction form and ties or hangs the form in position from the I-beam thereby transferring load from the support rod to the hanger and the beam.

Figure 4:
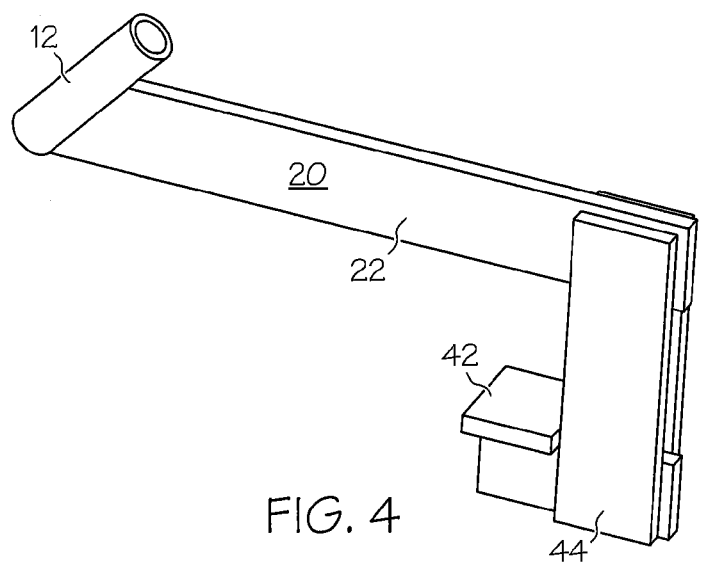
FIGS. 4-6 illustrate embodiments of the invention in which the hanger includes one or more barrier plates to distribute the forces acting on the hanger.
Figure 5:
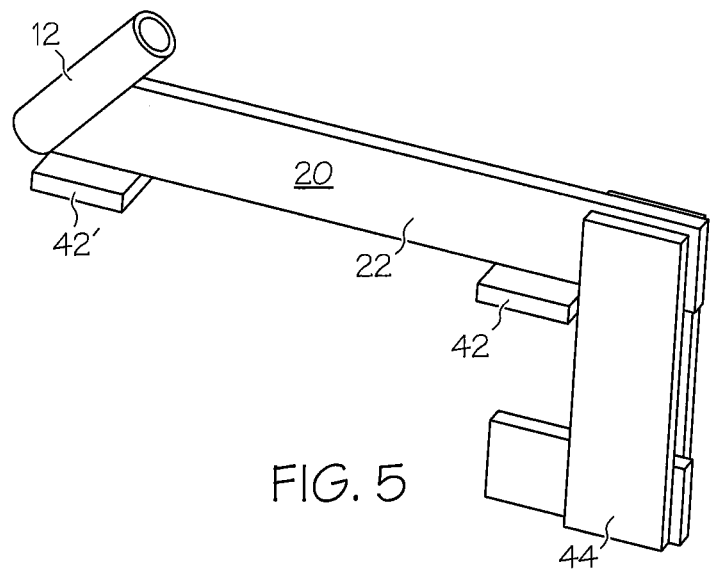
Figure 6:
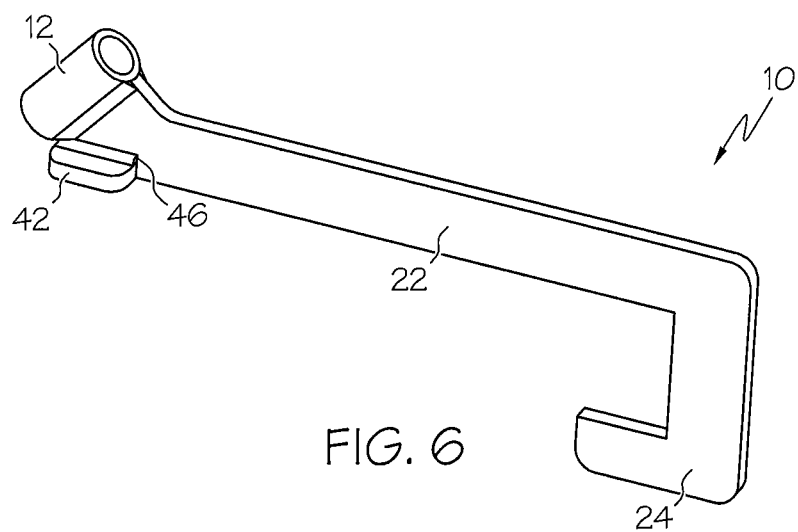

FIGS. 4-6 illustrate embodiments of the invention in which hanger 10 includes one or more bearing plates 42. In FIG. 4 the hanger is an assembly of rectangular plate members as shown which form a rectangular opening in the brace member similar in shape to the hanger illustrated in FIG. 3 which is formed from a cut metal sheet. The bearing plate 42 is situated on the lower portion of the arm 44 in this embodiment. In FIG. 5, two bearing plates 42 and 42' are attached to the lower surface of the elongated member 22 of the brace 20. These bearing plates function to distribute the forces that are acting on the hanger over a larger surface area of the construction support member to prevent damage or premature failure of the support member. FIG. 6 illustrates an embodiment in which the bearing plate 42 is received in a cutout 46 in the elongated bar 22 forming the brace 20. Alternative arrangements of bearing plates are also contemplated. For example, a single bearing plate may be utilized to engage the beam along the entire or major portion of the length of the brace. Alternatively, multiple bearing plates may be provided along the length of the brace. Finally, the retainer and flange may be constructed from components having an I- or T-shaped profile so that the bearing plate is integrally formed with the hanger.

Figure 8:
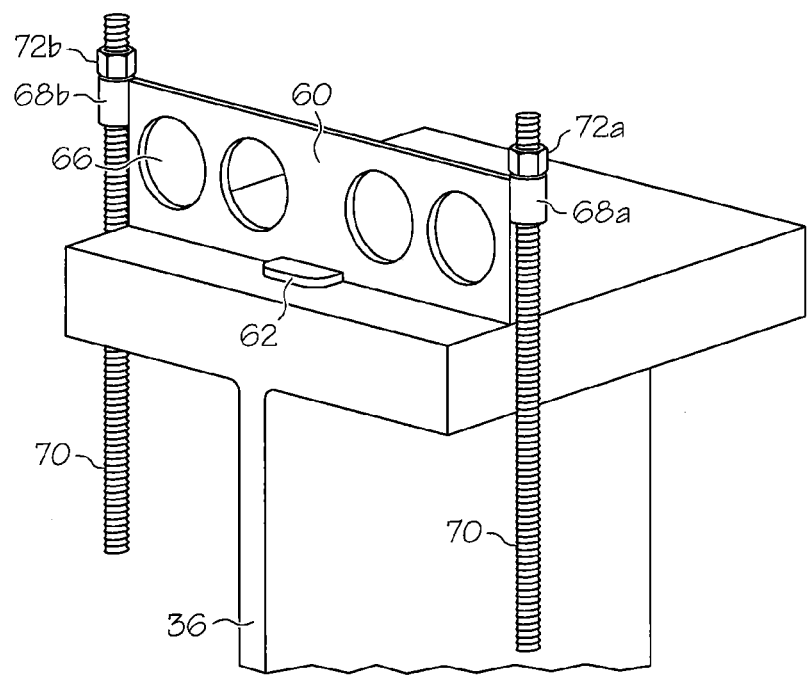
FIG. 8 illustrates a further embodiment of the invention in which the hanger includes a pair of guide members.

FIG. 8 illustrates another embodiment of the invention in which the hanger is formed from a plate 60 optionally having apertures 66 therein. The plate 60 is rectangular in shape and has a pair of tubular guide members 68a and 68b extending from each of its side edges. A pair of hanging rods 70a and 70b are inserted through the guide members and retained by threaded nuts 72a and 72b. Optional bearing plate 62 extends from a cutout in the bottom edge of the plate 60 such that the hanger is stabilized on the top of the I-beam 36.

Representative examples of construction support members with which hangers of the embodiments of the invention may be used include but are not limited to (a) an I- or T-beam; (b) a square or C-beam; (c) an I- or T-beam having a tapered top plate; and (d) any other type of beam having a square edge, including an I-beam, T-beam, C-beam, square beam, and angle beam. These variations are only proposed illustrations and are not intended to be limiting.

FIGS. 1A-1C show various embodiments of the guide (or tube) that may be used to engage and hold the support rod. According to these embodiments, the guide may be a round tube (top); square tube (middle); or C- or U-Channel (bottom). These embodiments are provided as illustrative and not intended to be limiting. For example, the guide may include an angle, hexagonal, or other shaped channels for accommodating a support rod. Alternatively, the support rod may be integrally formed with the hanger.

In FIG. 3, the guide has been bonded to the brace by means of a fillet weld. However, it should be appreciated that other means of attaching the clip and braces together are anticipated. For example, the means may include bonding by an adhesive, tac or other type of weld, or other type of joint. Alternatively, the means may include physical attachment, including without limitation: screws, straps, interference fit, or other mechanical interface. Further, the guide may be integrally formed with the brace either in a finished state or additional machining, such as bending a guide to form a tube, may be performed to provide the guide. Further shown in FIG. 3 is that the brace may be cut from ¼" steel plate.

FIGS. 5-7 show various alternative embodiments of the hanger, including the arrangement of the flange section and placement of optional bearing braces. The top (hereafter "FIG. 5") and middle (hereafter "FIG. 6") illustrations show the flange as a separately formed component formed from a number of flat bars which may be bonded (e.g. welded) or mechanically attached (e.g. screwed) to one another. The advantage of these arrangements is that the flange may be manufactured from several sections of steel bar. The bottom illustration (hereafter "FIG. 7") shows the flange according to the embodiments illustrated in e.g. FIG. 2 as a single piece cut from a sheet of material, e.g. ¼" steel plate. The advantage of this arrangement is that the number of steps for manufacture is reduced and the single-piece construction may be preferred to a welded multiple-piece construction in some applications.

FIG. 8 also illustrates several variations of the location of bearing plates. As shown in FIG. 5, a single bearing plate is illustrated. This bearing plate is located on the portion of the flange that would engage the underside of an I-beam or similar. FIG. 6 illustrates two bearing plates that may be positioned at the proximal and distal ends of the brace and would engage the top plate of an I-beam or similar. FIG. 7 illustrates that a single bearing plate may be positioned at the proximal end (adjacent the guide) to engage the top of an I-beam or the like. Also shown in FIG. 5 is that the bearing plates may be either flush with or protruding from the profile of the brace and flange. FIG. 6 shows the bearing plates extending from the brace so that the bearing plates would contact the beam and the plate would not. FIG. 7 shows that the bearing plates may be recessed so that the load is shared between the bearing plates and the brace. In the first instance, it is necessary to design the profile of the brace and flange to account for the increased spacing between the brace and flange.

Having described the invention in detail and by reference to specific embodiments thereof it will be apparent that numerous variations and modifications are possible without departing from the spirit and scope of the disclosure.

What is claimed is:

1. A construction hanger comprising:
a brace including an elongated planar bar having a proximal end and a distal end;
a coplanar arm extending from the distal end of the elongated planar bar at an angle thereto, the coplanar arm and the elongated planar bar cooperating to hold a construction support member within the brace;
the proximal end of the elongated planar bar having an end surface sloped at another angle relative to the elongated planar bar; and
a guide having a major axis supported on and aligned with the sloped end surface, the guide being capable of receiving a hanger member for supporting a concrete form;
the guide tying the hanger member to the construction support member by means of the brace.

2. The hanger of claim 1 wherein the guide is bonded to the brace.

3. The hanger of claim 1 wherein the coplanar arm is a metal plate material extending from the distal end of the elongated planar bar.

4. The hanger of claim 1 wherein the guide is an elongated circular or square tube or an elongated U-shaped channel.

5. The construction hanger of claim 4, wherein the guide is bonded to the sloped end surface by an adhesive or a weld.

6. The hanger of claim 1 wherein the hanger is used in assembly with a rod member that extends through the guide.

7. The hanger of claim 1 wherein the coplanar arm is perpendicular to the elongated planar bar.

8. The hanger of claim 1 wherein the coplanar arm includes a right angle extension that conforms to a profile of the construction support member.

9. The hanger of claim 1 wherein the elongated planar bar forming the brace includes an upper surface which is opposite a lower surface that contacts a surface of the construction support member, and wherein a distance between the upper surface and the lower surface is wider at the proximal end so as to form a triangular extension on the upper surface that extends the sloped end surface to distribute forces exerted by the guide over a larger surface area.

10. The hanger of claim 9 wherein the triangular extension is coterminous with an end of the guide.

11. The hanger of claim 1 wherein the brace additionally includes one or more bearing plates.

12. The hanger of claim 11 wherein at least one bearing plate is positioned on a lower surface of the elongated planar bar.

13. The construction hanger of claim 1, wherein the brace and the coplanar arm are a single flat sheet of material such that substantially all of the arm is in a same plane as substantially all of the elongated planar bar.

14. The construction hanger of claim 1, wherein the coplanar arm further comprises one or more plates coupled to the distal end of the elongated planar bar and extending perpendicularly therefrom.

15. The construction hanger of claim 1, wherein the elongated planar bar and the coplanar arm form a profile that is complementary to a profile of the construction support member such that the brace fits the profile of the construction support member.

16. A construction hanger comprising:
a brace having an elongated planar member with a proximal end, a distal end, a lower surface and an upper surface, wherein the proximal end terminates in a sloped end surface that is at an angle relative to the elongated planar member and extends from the lower surface to at least the upper surface;
a coplanar arm extending from the distal end of the elongated planar member and at another angle thereto, wherein the elongated planar member and the coplanar arm form a hook to engage a profile of a construction support member; and
a guide having a major axis aligned with the sloped end surface, wherein the guide is capable of receiving a hanger member, the guide tying the hanging member to the construction support member by means of the brace.

* * * * *